United States Patent
Lindholm et al.

(10) Patent No.: US 7,339,592 B2
(45) Date of Patent: Mar. 4, 2008

(54) SIMULATING MULTIPORTED MEMORIES USING LOWER PORT COUNT MEMORIES

(75) Inventors: John Erik Lindholm, Saratoga, CA (US); Ming Y. Siu, Sunnyvale, CA (US); Simon S. Moy, Los Altos, CA (US); Samuel Liu, Cupertino, CA (US); John R. Nickolls, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 240 days.

(21) Appl. No.: 10/889,730

(22) Filed: Jul. 13, 2004

(65) Prior Publication Data

US 2006/0012603 A1    Jan. 19, 2006

(51) Int. Cl.
*G06F 12/02* (2006.01)
*G06F 13/00* (2006.01)
*G09G 5/36* (2006.01)

(52) U.S. Cl. .................. 345/543; 345/559; 345/536
(58) Field of Classification Search ................ 345/559, 345/530, 543, 536; 712/216, 220; 711/5, 711/153, 147–149, 169
See application file for complete search history.

(56) References Cited

U.S. PATENT DOCUMENTS

| | | | | |
|---|---|---|---|---|
| 6,091,430 A | * | 7/2000 | Bodin et al. ................. | 345/536 |
| 6,092,175 A | * | 7/2000 | Levy et al. ................... | 712/23 |
| 6,154,826 A | * | 11/2000 | Wulf et al. .................. | 711/217 |
| 6,167,486 A | * | 12/2000 | Lee et al. .................... | 711/120 |
| 6,795,889 B2 | * | 9/2004 | Berg et al. ...................... | 711/5 |
| 2002/0103990 A1 | * | 8/2002 | Potash ........................ | 712/215 |
| 2003/0041228 A1 | * | 2/2003 | Rosenbluth et al. ......... | 712/220 |
| 2003/0163669 A1 | * | 8/2003 | DeLano ....................... | 712/24 |
| 2004/0080512 A1 | * | 4/2004 | McCormack et al. ....... | 345/543 |

FOREIGN PATENT DOCUMENTS

EP    0 962 856    8/1999

OTHER PUBLICATIONS

International Search Report, filed Aug. 16, 2006.
Carl A. Waldspurger, et al. "Register Relocation: Flexible contents for Multithreading", Proceedings of the Annual International Symposium on Computer Architecture, vol. Symp. 20, May 16, 1993 pp. 120-130.

* cited by examiner

*Primary Examiner*—Kee M. Tung
*Assistant Examiner*—Joni Hsu
(74) *Attorney, Agent, or Firm*—Patterson & Sheridan, LLP

(57) ABSTRACT

An apparatus and method for simulating a multiported memory using lower port count memories as banks. A portion of memory is allocated for storing data associated with a thread. The portion of memory allocated to a thread may be stored in a single bank or in multiple banks. A collector unit coupled to each bank gathers source operands needed to process a program instruction as the source operands output from one or more banks. The collector unit outputs the source operands to an execution unit when all of the source operands needed to process the program instruction have been gathered.

21 Claims, 10 Drawing Sheets

SIMULATING MULTIPORTED MEMORIES USING LOWER PORT COUNT MEMORIES

FIELD OF THE INVENTION

One or more aspects of the invention generally relate to data processing, and more particularly to using single port memories to simulate a multiported memory in a programmable graphics processor or general purpose processor.

BACKGROUND

Current data processing includes systems and methods developed to execute program instructions, including instructions with two or more operands. The operands are stored in registers within the processor for efficient access during the execution of a program. Some program instructions, such as, multiply and multiply-accumulate specify two or more operands. Conventionally, a register file includes a multiported memory so that two or more locations, each location storing an operand, may be read in a single clock cycle. Therefore, all of the operands needed for at least one program instruction may be acquired and output to an execution unit in a single clock cycle.

Compared with a single ported memory, a multiported memory requires more die area and uses more power. However, unlike a multiported memory, only a single location may be read in each clock cycle. Therefore, two or more clock cycles are needed to acquire the operands needed to execute one program instruction, reducing performance compared with a multiported memory.

Accordingly, it would be desirable to provide the performance advantages of a multiported register file within a processor using less die area and power.

SUMMARY

The current invention involves new systems and methods for simulating a multiported memory using lower port count memories as banks. A portion of memory is allocated for storing data associated with a thread. The portion of memory allocated to a thread may be stored in a single bank or in multiple banks. A collector unit coupled to each bank gathers source operands needed to process an instruction as the source operands are output from one or more banks. The collector unit outputs the source operands to an execution unit when all of the source operands needed to process the instruction have been gathered. Using lower port count memories to simulate a multiported memory requires less die area than a multiported memory of comparable capacity. Lower port count memories configured to simulate a multiported memory also have lower power requirements compared with a multiported memory of comparable capacity.

Various embodiments of the invention include a register file unit for storing operands for processor program instructions. The register file unit includes a first memory bank configured to store operands for a first thread, a second memory bank configured to store operands for a second thread, a first collector unit, and a second collector unit. The first collector unit is configured to receive the operands for the first thread from the first memory bank and output a program instruction of the first thread and any operand specified by the program instruction of the first thread. The second collector unit is configured to receive the operands for the second thread from the second memory bank and output a program instruction of the second thread and any operand specified by the program instruction of the second thread.

Various embodiments of a method of the invention include determining a number of registers allocated for a thread and allocating the number of registers for the thread to locations in at least one memory bank of a set of memory banks configured to simulate a multiported memory.

Various embodiments of the invention include a system for storing operands for program instructions. The system includes means for allocating registers for storing operands used by a thread based on an allocation type, means for storing the operands in the registers, and means for gathering any operands specified by a program instruction within the thread.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

Figure 4A:
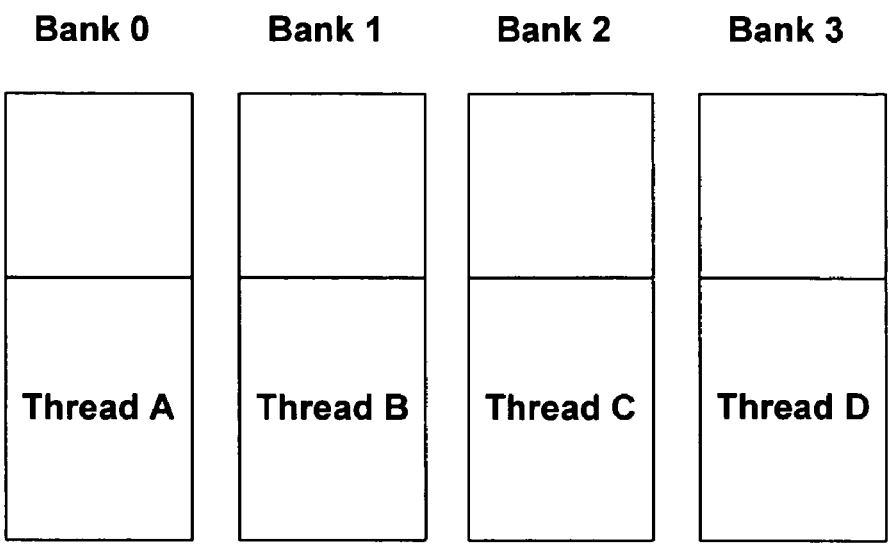
FIG. 4A is an exemplary embodiment of an allocation of registers for processing threads in accordance with one or more aspects of the present invention.
Figure 4B:
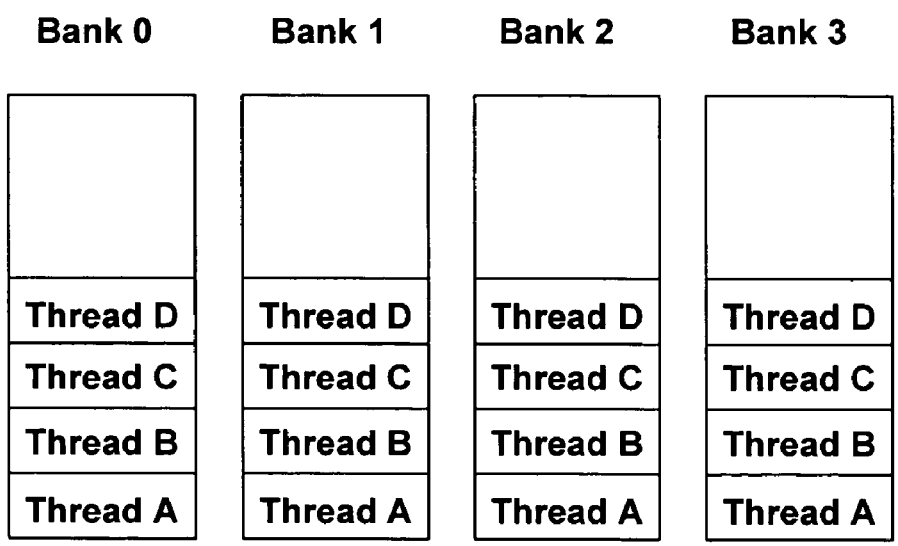
Figure 4C:
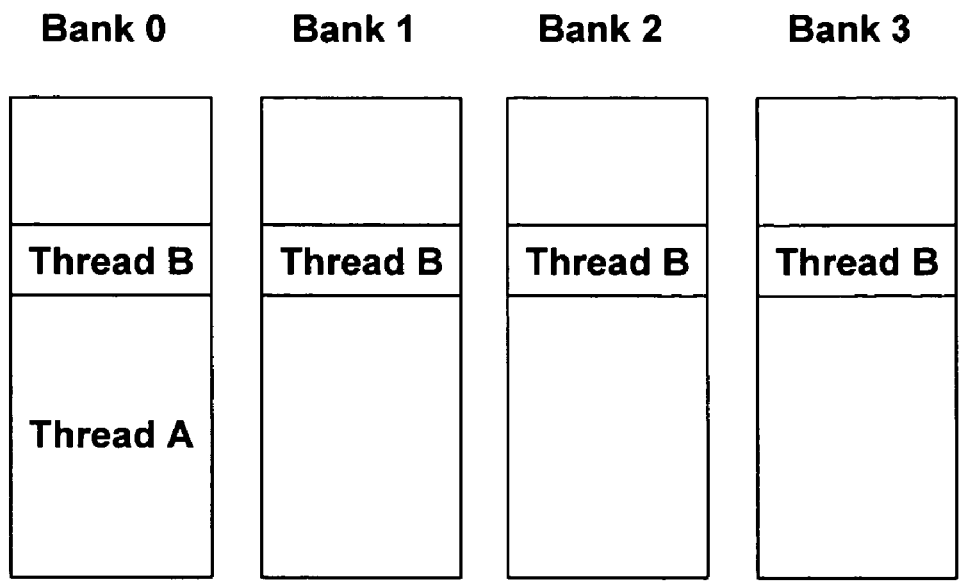
Figure 4D:
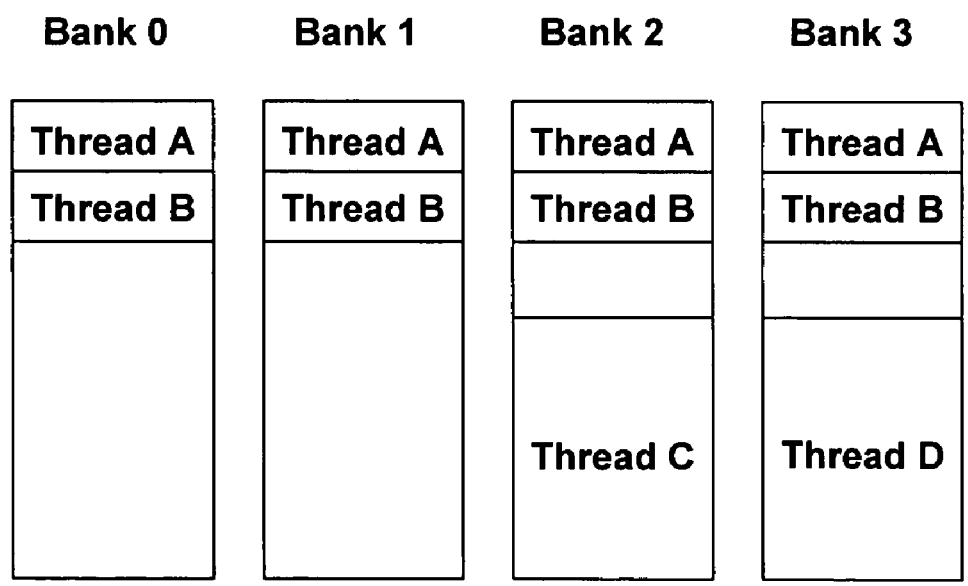

FIGS. 4B, 4C, and 4D are other exemplary embodiments of allocations of registers for processing threads in accordance with one or more aspects of the present invention.

Figure 4E:
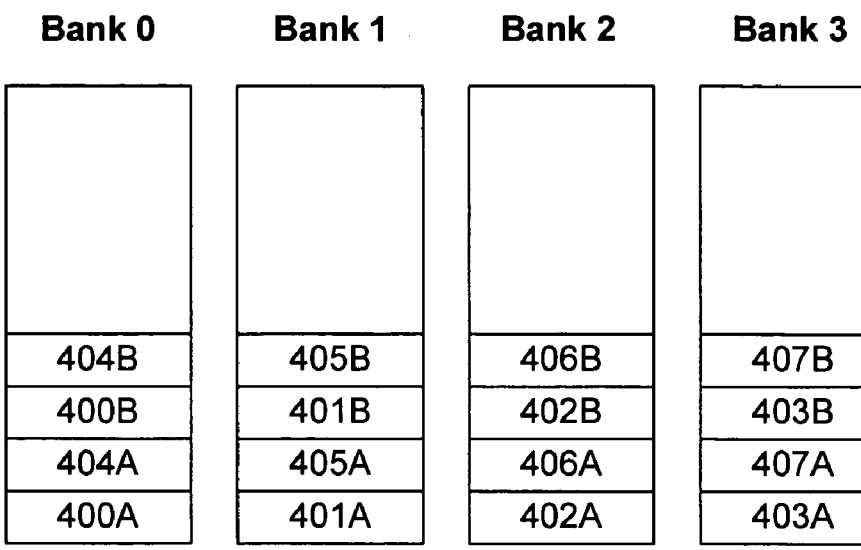

FIG. 4E is an exemplary embodiment of an assignment of registers for threads in accordance with one or more aspects of the present invention.

Figure 4F:
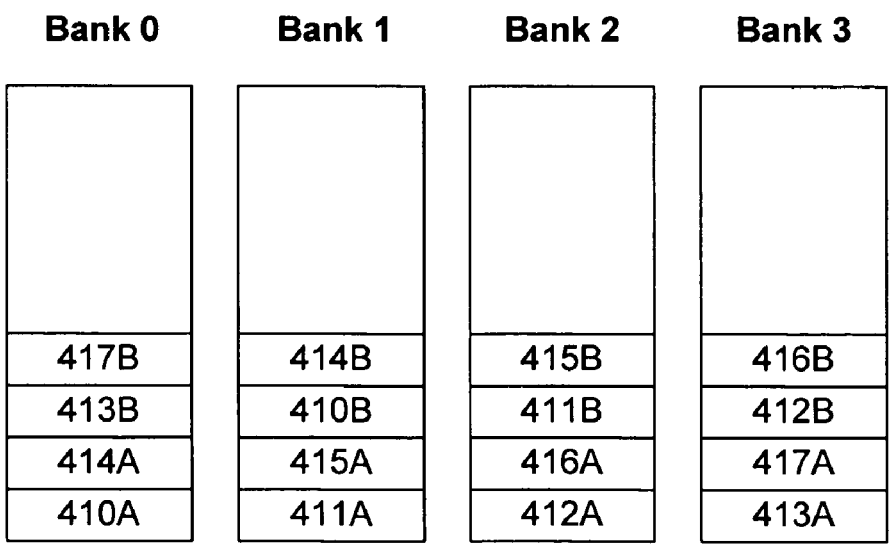

FIG. 4F is another exemplary embodiment of an assignment of registers for threads in accordance with one or more aspects of the present invention.

Figure 2:
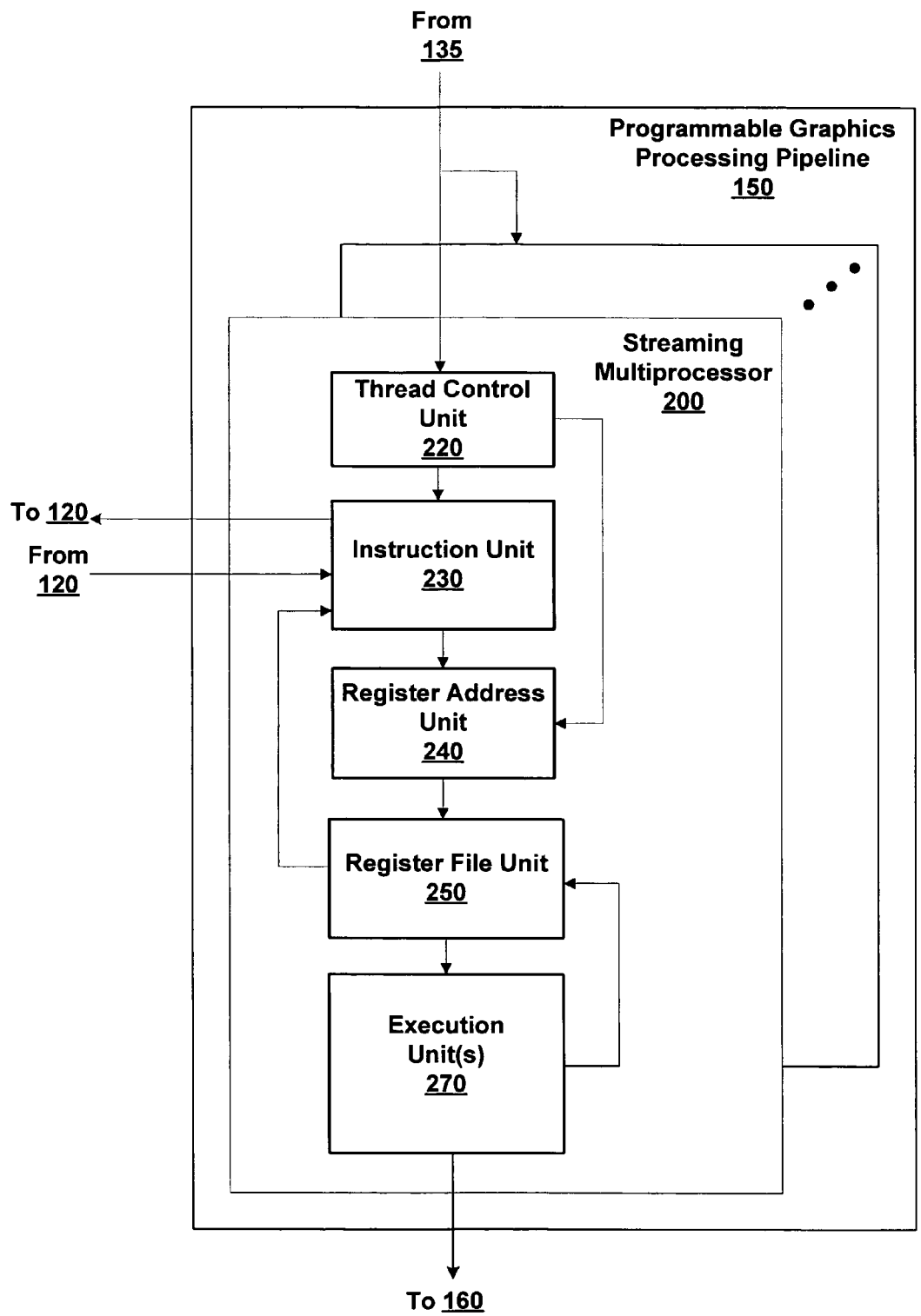
FIG. 2 is a block diagram of an exemplary embodiment of the Programmable Graphics Processing Pipeline of FIG. 1 in accordance with one or more aspects of the present invention.
Figure 5:
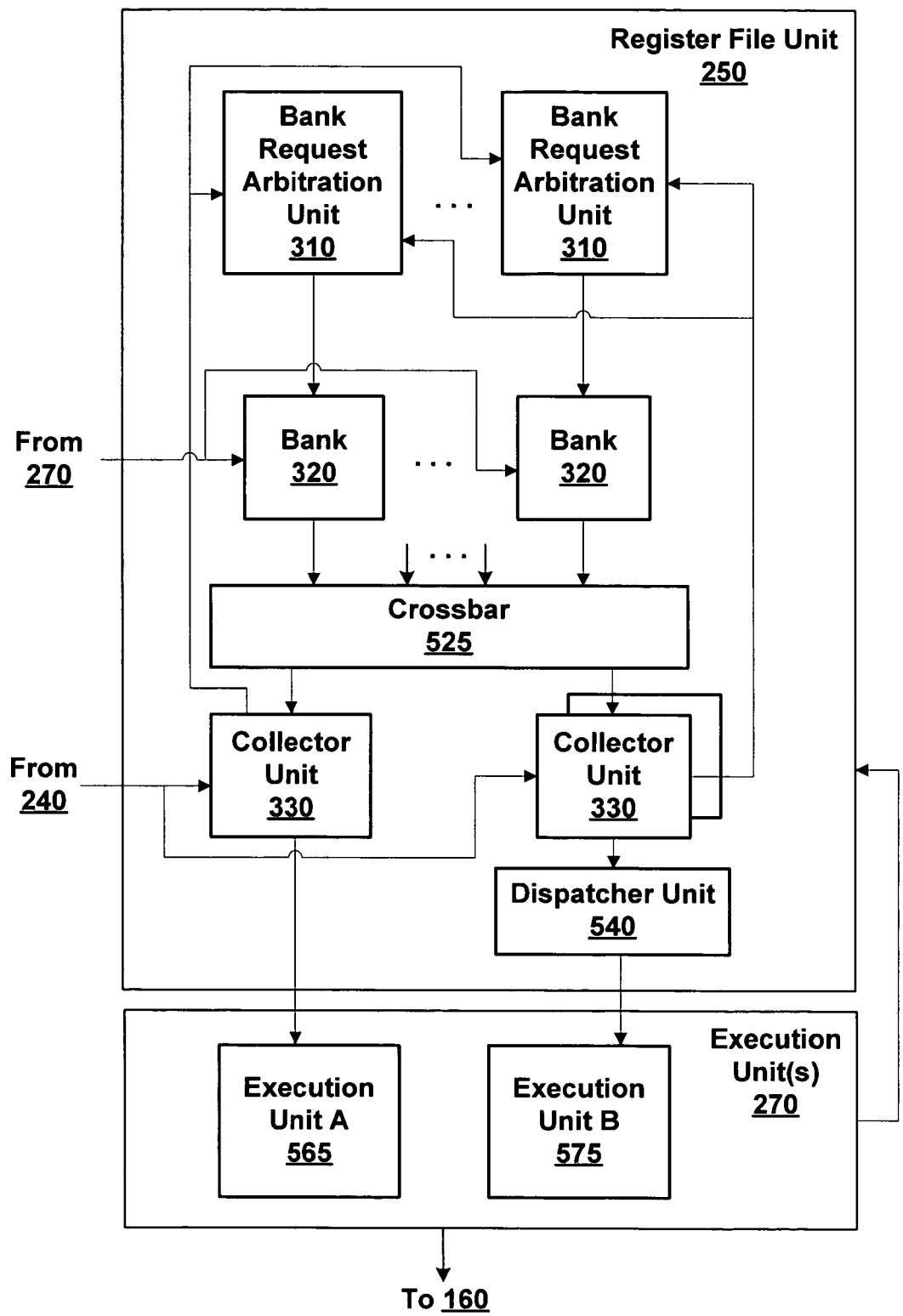

FIG. 5 is a block diagram of another exemplary embodiment of the Register File Unit of FIG. 2 in accordance with one or more aspects of the present invention.

Figure 6A:
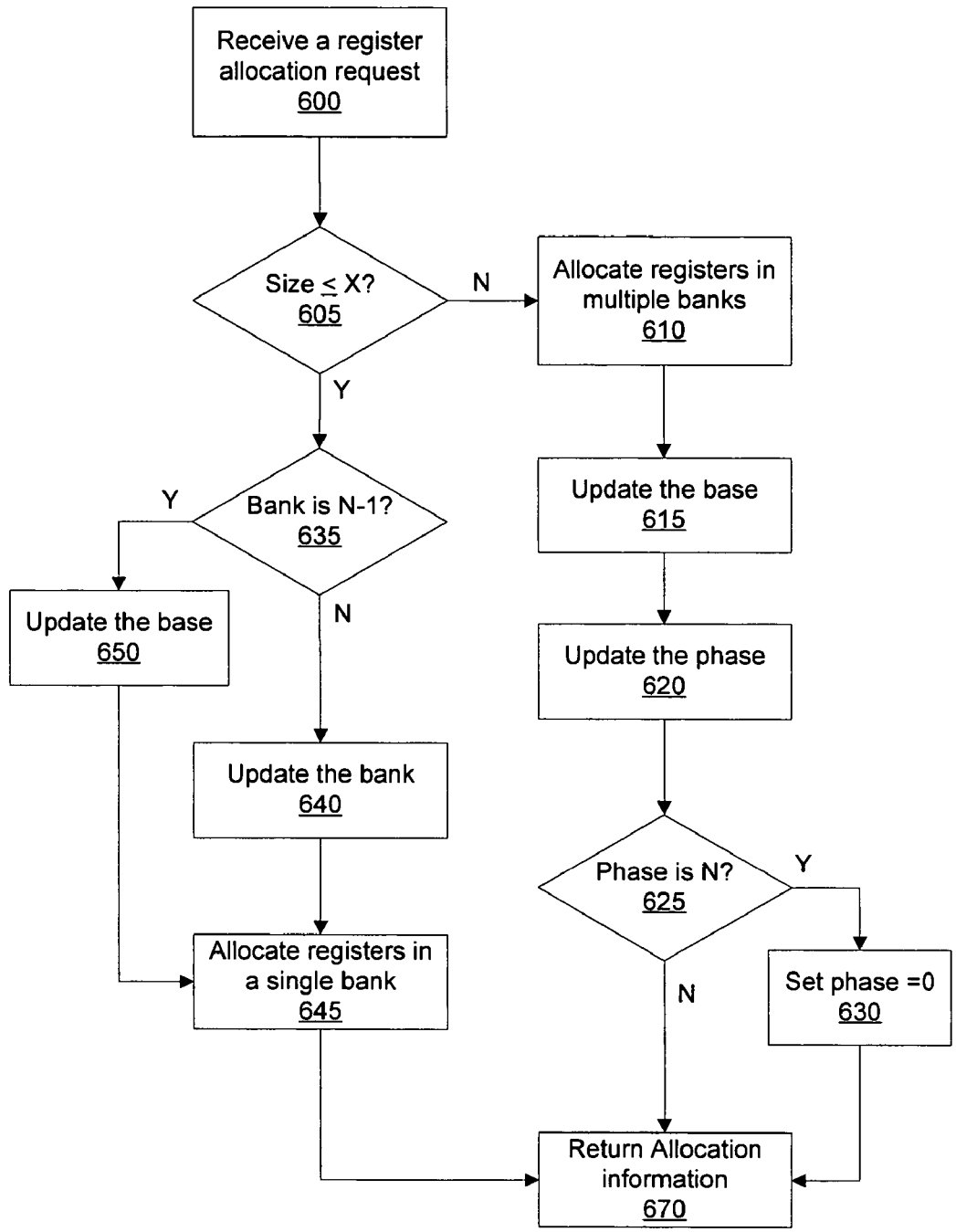

FIG. 6A illustrates an embodiment of a method of allocating registers for processing a thread in accordance with one or more aspects of the present invention.

Figure 6B:
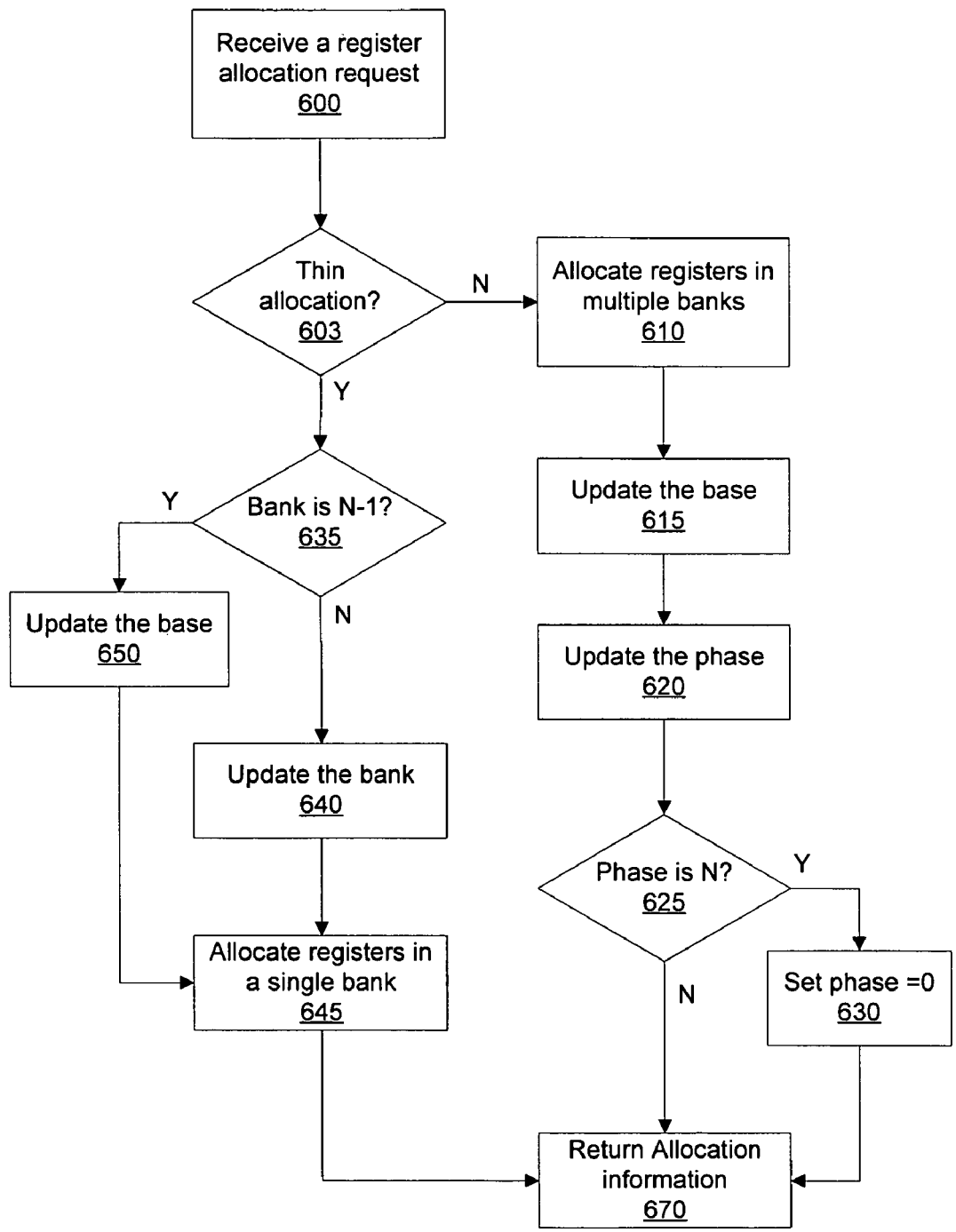

FIG. 6B illustrates an embodiment of another method of allocating registers for processing a thread in accordance with one or more aspects of the present invention.

Figure 6C:
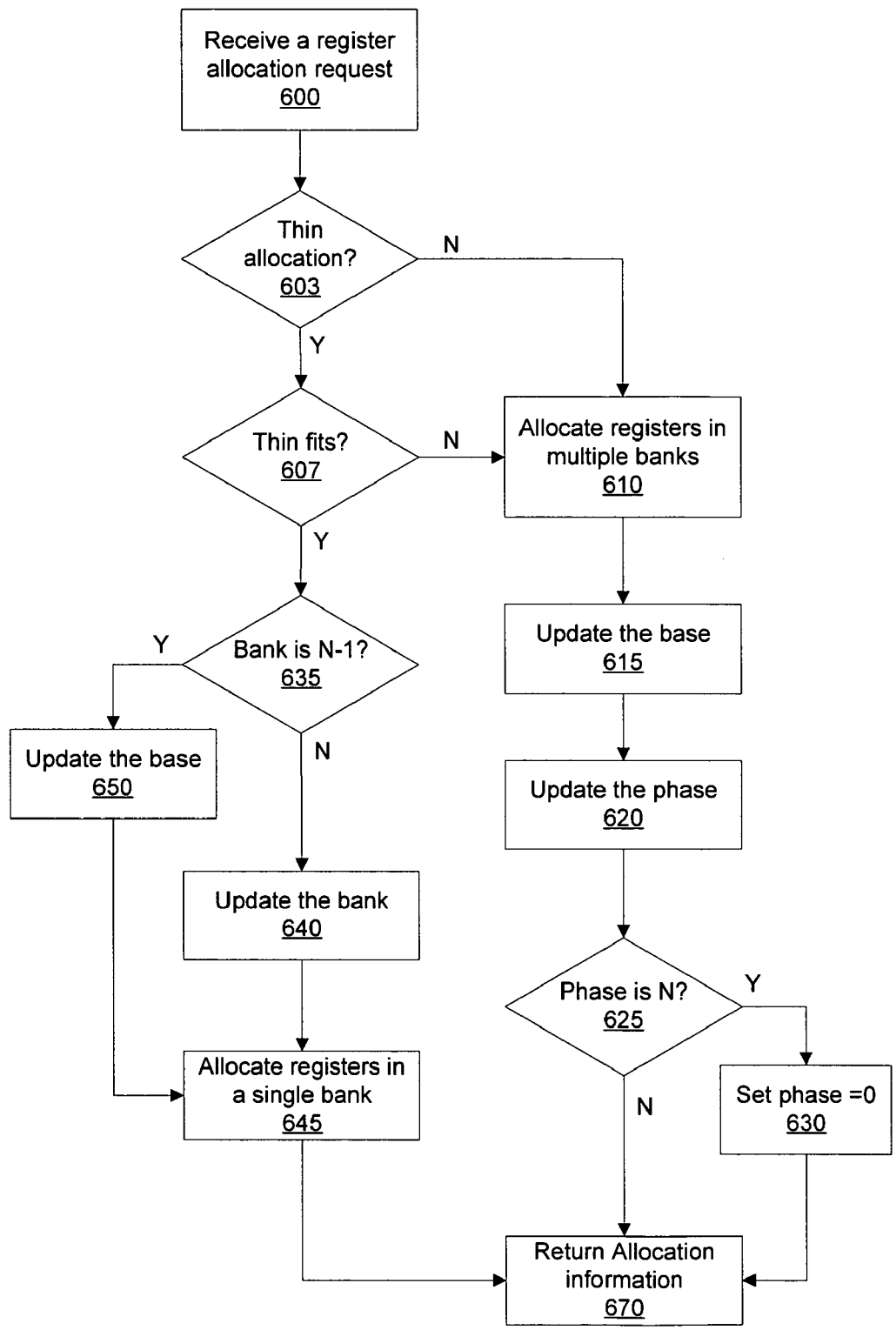

FIG. 6C illustrates an embodiment of another method of allocating registers for processing a thread in accordance with one or more aspects of the present invention.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
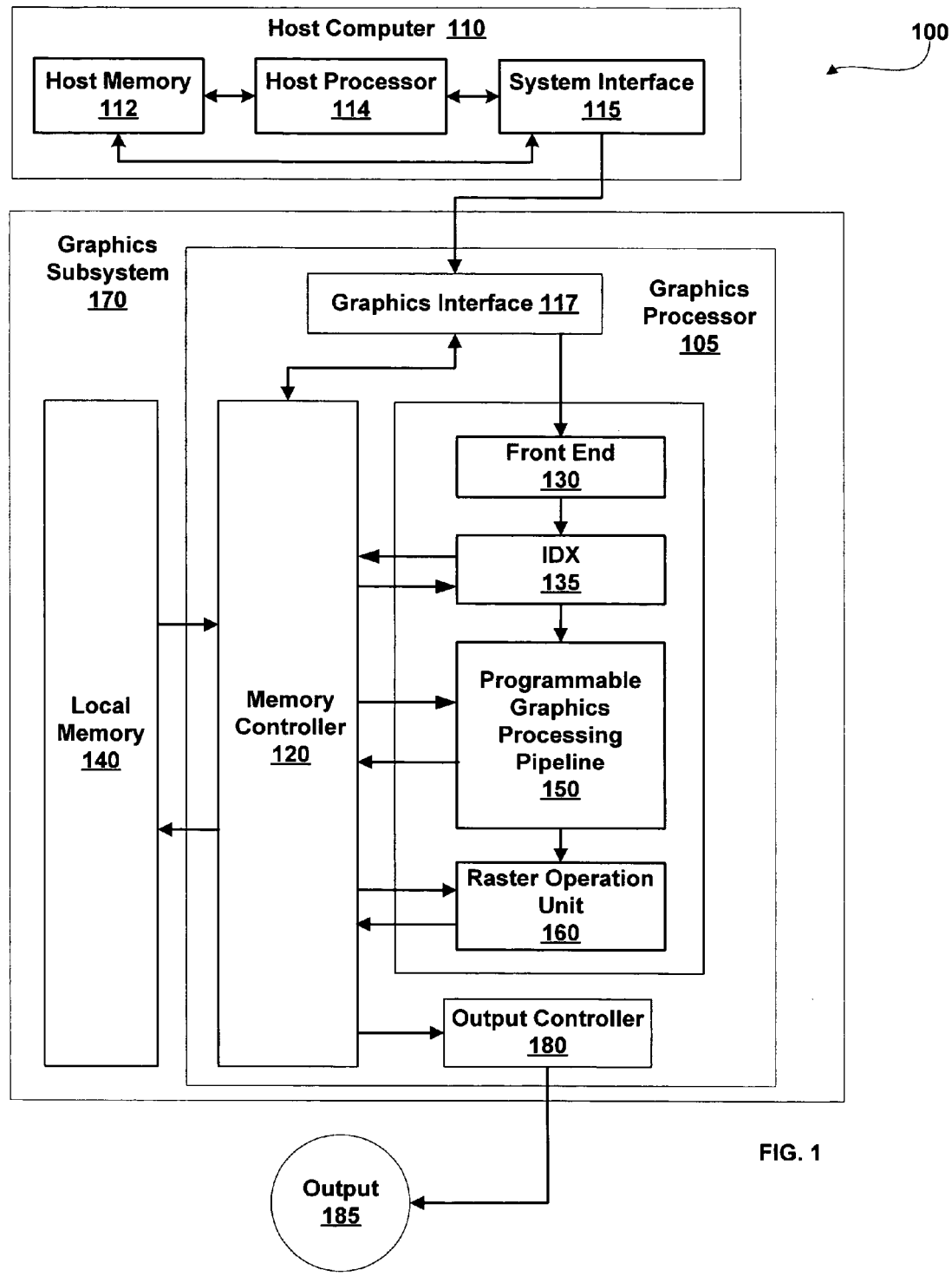
FIG. 1 is a block diagram of an exemplary embodiment of a respective computer system in accordance with one or more aspects of the present invention including a host computer and a graphics subsystem.

FIG. 1 is an illustration of a Computing System generally designated 100 and including a Host Computer 110 and a Graphics Subsystem 170. Computing System 100 may be a desktop computer, server, laptop computer, palm-sized computer, tablet computer, game console, portable wireless terminal such as a personal digital assistant (PDA) or cellular telephone, computer based simulator, or the like. Host Computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. An example of System Interface 115 known in the art includes Intel® Northbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory may include portions of Host Memory 112, Local Memory 140, register files coupled to the components within Graphics Processor 105, and the like.

Graphics Processor 105 includes, among other components, Front End 130 that receives commands from Host Computer 110 via Graphics Interface 117. Front End 130 interprets and formats the commands and outputs the formatted commands and data to an IDX (Index Processor) 135. Some of the formatted commands are used by Programmable Graphics Processing Pipeline 150 to initiate processing of data by providing the location of program instructions or graphics data stored in memory. IDX 135, Programmable Graphics Processing Pipeline 150 and a Raster Operation Unit 160 each include an interface to Memory Controller 120 through which program instructions and data can be read from memory, e.g., any combination of Local Memory 140 and Host Memory 112. When a portion of Host Memory 112 is used to store program instructions and data, the portion of Host Memory 112 can be uncached so as to increase performance of access by Graphics Processor 105.

IDX 135 optionally reads processed data, e.g., data written by Raster Operation Unit 160, from memory and outputs the data, processed data and formatted commands to Programmable Graphics Processing Pipeline 150. Programmable Graphics Processing Pipeline 150 and Raster Operation Unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 150 and Raster Operation Unit 160 are each optionally configured such that data processing operations are performed in multiple passes through those units or in multiple passes within Programmable Graphics Processing Pipeline 150. Raster Operation Unit 160 includes a write interface to Memory Controller 120 through which data can be written to memory.

In a typical implementation Programmable Graphics Processing Pipeline 150 performs geometry computations, rasterization, and fragment computations. Therefore, Programmable Graphics Processing Pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by Programmable Graphics Processing Pipeline 150 are passed to a Raster Operation Unit 160, which optionally performs near and far plane clipping and raster operations, such as stencil, z test, and the like, and saves the results or the samples output by Programmable Graphics Processing Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other computing system such as Computing System 100, other Graphics Subsystem 170, or the like. Alternatively, data is output to a film recording device or written to a peripheral device, e.g., disk drive, tape, compact disk, or the like.

FIG. 2 is an illustration of Programmable Graphics Processing Pipeline 150 of FIG. 1. At least one set of samples is output by IDX 135 and received by Programmable Graphics Processing Pipeline 150 and the at least one set of samples is processed according to at least one program, the at least one program including graphics program instructions. A program can process one or more sets of samples. Conversely, a set of samples can be processed by a sequence of one or more programs. Some embodiments of Programmable Graphics Processing Pipeline 150 include additional units configured to perform specific functions such as rasterization of primitive data to generate fragment data.

Samples, e.g., surfaces, primitives, processed data, or the like, are received by Programmable Graphics Processing Pipeline 150 from IDX 135. Surfaces may be processed by Streaming Multiprocessors 200 to produce primitives, the primitives may be processed by Streaming Multiprocessors 200 to produce vertices, and the vertices may be processed by Streaming Multiprocessors 200 to produce fragments. In alternative embodiments of the present invention one or more Steaming Multiprocessors 200 is included within a general purpose processor, such as Host Processor 114. Programmable Graphics Processing Pipeline 150 includes one or more Streaming Multiprocessors 200, as shown in FIG. 2. Each Streaming Multiprocessor 200 includes at least Execution Unit(s) 270, to be described further herein. The samples may be processed by any one of the Streaming Multiprocessors 200. In some embodiments of Streaming Multiprocessor 200, a read interface (not shown in FIG. 2) is used to read graphics data such as texture maps from Local Memory 140 or Host Memory 112 via Memory Controller 120. A sample is accepted by a Streaming Multiprocessor 200 when a processing thread within the Streaming Multiprocessor 200 is available, as described further herein.

A Thread Control Unit 220 within a Streaming Multiprocessor 200 receives samples and a pointer to a sequence of program instructions to be executed to process the samples. Thread Control Unit 320 assigns a thread to each sample to be processed. A thread includes a pointer to a program instruction (program counter), such as the first instruction within the program, thread state information, and storage resources for storing operands used and generated during processing of the sample. When a resource, e.g. storage resource for storing operands or thread state information, needed to process a thread is not available, the Streaming Multiprocessor 200 will not accept additional samples for processing. When the program instructions associated with a thread have completed execution, the storage resources, e.g., registers, allocated to store operands received and generated during execution of the thread become available for allocation to another thread, i.e., the storage resources are deallocated and the thread is flagged as available in Thread Control Unit 220.

Thread Control Unit 220 outputs allocation information specifying the quantity of storage resources needed for storing operands to a Register Address Unit 240. Thread Control Unit 220 outputs the pointer and the samples to an Instruction Unit 230. The number of pointers and samples that can be output each clock cycle from Thread Control Unit 220 to Instruction Unit 230 may vary between different embodiments of the present invention.

Instruction Unit 230 uses a dedicated read interface to read the program instructions from Local Memory 140 or Host Memory 112 via Memory Controller 120. In an alternate embodiment of the present invention, a single Instruction Unit 230 is shared between Streaming Multiprocessors 200. In some embodiments of the present invention, Instruction Unit 230 includes an instruction cache.

Instruction Unit 230 executes instructions which do not process data, such as jump, call/return, or branch instructions. Instruction Unit 230 schedules the execution of the program instructions, interleaving the program instructions to process any threads that are active, i.e., assigned to a sample. In some embodiments of the present invention, Instruction Unit 230 schedules the execution of the program instructions without additional information specifying the specific locations of the registers within a Register File Unit 250 that are allocated to the threads, e.g., the bank that the registers is located in.

Instruction Unit 230 may be configured to use fixed or programmable priorities when scheduling program instructions for threads. For example, threads allocated to process vertex program instructions may always get higher priority than threads allocated to process fragment program instructions. In another example, threads requiring a large number of registers for storing operands may have higher priority than threads requiring fewer registers for storing operands. In some embodiments of the present invention, Instruction Unit 230 receives information from a Register File Unit 250 indicating utilization of registers for particular threads and Instruction Unit 230 adjusts the priority of the particular threads accordingly to reduce or increase the utilization of registers in Register File Unit 250.

In other embodiments of the present invention, Instruction Unit 230 schedules the execution of the program instructions using additional information specifying the specific locations of the registers within a Register File Unit 250. For example, the program instructions are pre-sorted into groups based on the bank within Register File Unit 250 where one or more of the operands for the instruction are stored. Instruction Unit 230 selects one program instruction from each group in a round-robin fashion, outputting one or more program instructions to Register Address Unit 240 each clock cycle.

Instruction Unit 230 outputs the program instructions and samples to Register Address Unit 240. Register Address Unit 240 accesses registers within Register File Unit 250 that store operands specified by each thread, as described in conjunction with FIG. 3 and FIG. 5. Register Address Unit 240 outputs requests for each program instruction. Examples of requests include a read request for a specific operand or a write request for a specific operand. In one embodiment of the present invention, Register Address Unit 240 outputs requests for a single instruction during each clock cycle. For example, for a load instruction (LD), one (1) write request is output to write an operand to a register. Similarly, for a multiply-accumulate (MAD) instruction, 3 read requests (one for each source operand) and 1 write request (for the destination operand) are output.

Register Address Unit 240 outputs the requests and a corresponding program instruction, e.g., MAD, to Register File Unit 250. Register File Unit 250 processes the requests, reading operands to and writing operands from registers within Register File Unit 250. Register File Unit 250 schedules processing of the requests to avoid write back conflicts and cycle based conflicts. In some embodiments of the present invention, Register File Unit 250 uses a scoreboard unit to track the status of operand writes to registers to determine when an operand may be read from a register.

When read requests are processed to acquire operands needed to process a program instruction, Register File Unit 250 determines when all of the operands have been acquired and then outputs the program instruction and operands to Execution Unit(s) 270 for processing. Execution Unit(s) 270 returns processed operands to Register File Unit 250 to be written to destination operands as specified by program instructions. Execution Pipeline 240 is configured by the program instructions to perform operations such as tessellation, perspective correction, interpolation, shading, blending, and the like. Processed samples are output from each Execution Pipeline 240 to Raster Operation Unit 160. In some embodiments of the present invention, additional Execution Pipelines 240 are coupled to Register File Unit 250 and Raster Operation Unit 160.

Figure 3:
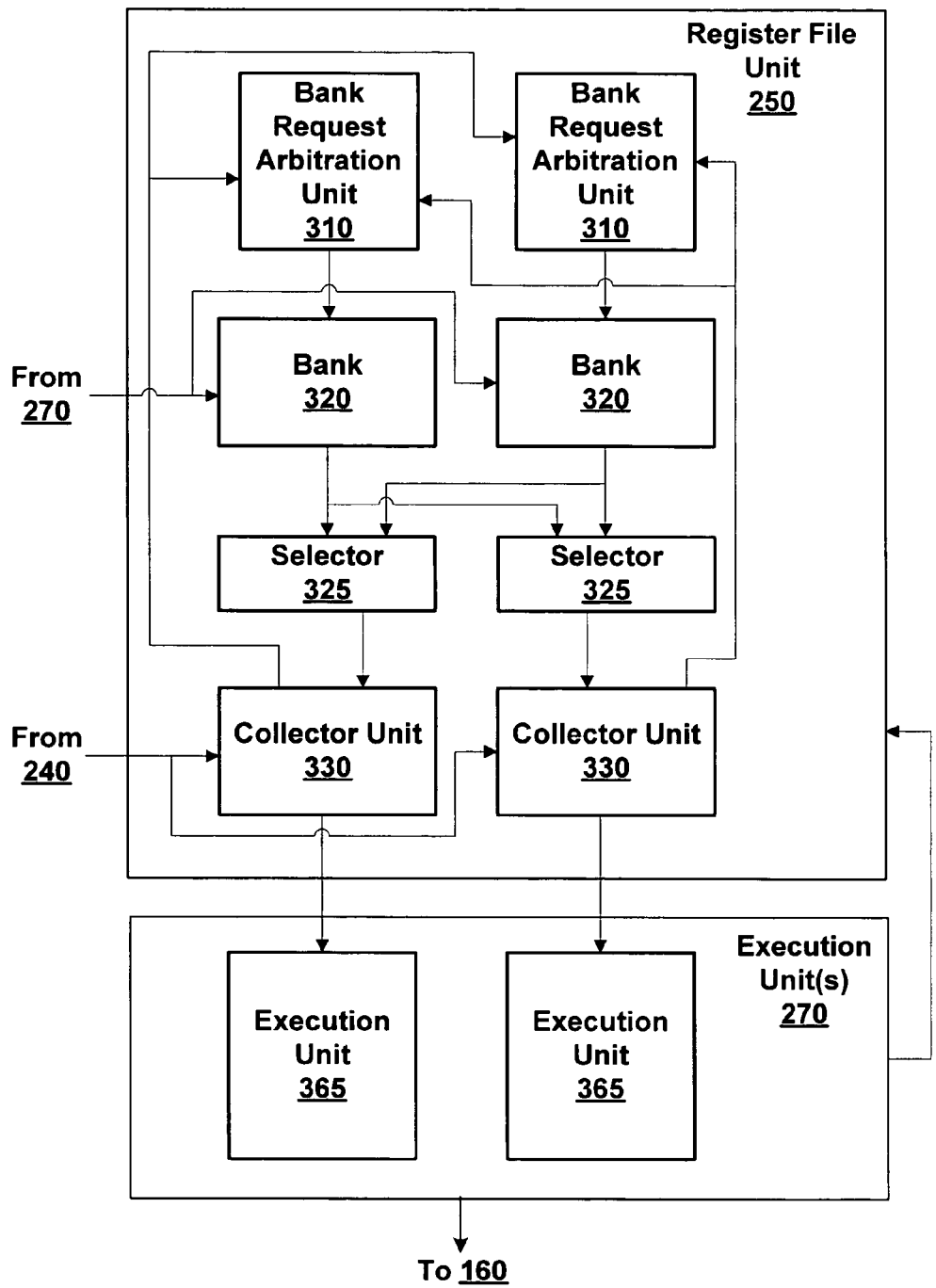
FIG. 3 is a block diagram of an exemplary embodiment of the Register File Unit of FIG. 2 in accordance with one or more aspects of the present invention.

FIG. 3 is a block diagram of an exemplary embodiment of Register File Unit 250 shown in FIG. 2 in accordance with one or more aspects of the present invention. In alternate embodiments of the present invention Register File Unit 250 is used within a general purpose processor, such as Host Processor 114. Register File Unit 250 includes two or more memory banks, Banks 320 that are configured to simulate a single multiported memory. Each Bank 320 includes several locations which function as registers that are configured to store operands. Each Collector Unit 330 receives the requests and the corresponding program instruction from Register Address Unit 240 and determines if the program instruction is an instruction for execution by the particular Execution Unit 365 coupled to the Collector Unit 330. If the program instruction is an instruction for execution by the particular Execution Unit 365 coupled to the Collector Unit 330, the Collector Unit 330 accepts the program instruction and requests for processing. In some embodiments of the present invention, each Execution Unit 365 is identical and a priority scheme is used to determine which Execution Unit 365 will execute the program instruction. Alternative embodiments of the present invention assign the instruction to the least-loaded Execution Unit 365. In some embodiments of the present invention two or more Collector Units 330 are coupled to a single Execution Unit 365 and a priority scheme is used to choose which of the two or more Collector Units outputs operands to the single Execution Unit 365 for processing.

Each Collector Unit 330 outputs requests for accepted program instructions to any Bank Request Arbitration Unit 310. Each Bank Request Arbitration Unit 310 determines if the request requires a read of a register in the particular Bank 320 coupled to the Bank Request Arbitration Unit 310. Some possible register allocations are described in conjunction with FIGS. 4A, 4B, 4C, 4D, 4E, and 4F. Each request is output by one Bank Request Arbitration Unit 310 to the Bank 320 where the register assigned to the operand specified in the request is located. Accepted program instructions remain in Collector Units 330 designated to gather the operands. Each Bank Request Arbitration Unit 310 also arbitrates between the different Collect Units 330 and outputs one request per clock cycle to the Bank 320 coupled to the Bank Request Arbitration Unit 310.

Each Bank 320 includes a read request port for receiving requests from a Bank Request Arbitration Unit 310. Each Bank 320 also includes a write request port for receiving write requests from Execution Unit(s) 270 to write processed data to a destination register assigned to an operand specified by a program instruction. Therefore, 2 banks of lower port count memories (1 write port and 1 read port) are used to simulate a multiport memory with 2 write ports and 2 read ports. In some embodiments of the present invention, additional request ports are used. In other embodiments of the present invention, the read request port is combined with the write request port, accessing a single-port memory. During a clock cycle, each Bank 320 may output an operand specified by read request to a corresponding Collector Unit 330 via a Selector 325. Therefore, when a program instruction specifies 3 operands for source data, at least 3 clock cycles are needed to gather the operands when they reside in the same Bank 320. Each Collector Unit 330 may also gather source data, such as constants and intermediate data that are stored in registers outside of Banks 320 (not shown). Selectors 325 receive source data not stored in Banks 320 from inputs (not shown). When all of the operands are gathered by a Collector Unit 330, the program instruction is ready to be dispatched. In some embodiments of the present invention, additional Bank Request Arbitration Units 310, Banks 320, Selectors 325, and Collector Units 330 are included to increase the number of operands that are read during a clock cycle. In one embodiment of the present invention, Selectors 325 are omitted and each Bank 320 is coupled directly to a Collector Unit 330.

When all of the operands for a program instruction have been gathered by a Collector Unit 330, the program instruction and operands are output by the Collector Unit 330 to the Execution Unit 365 coupled to the Collector Unit 330 for processing. When execution of the program instruction is completed, the Execution Unit 365 outputs a write request to one of Banks 320 if a destination operand was specified by the program instruction. Execution Unit 270(s) may also output processed operands to Raster Operation Unit 160. In some embodiments of the present invention, each Execution Unit 365 processes more than one instruction resulting in a throughput of more than one instruction per clock cycle. Execution of different instructions may incur different latencies as they are processed by Execution Unit 365.

In one embodiment of the present invention, registers for storing operands for processing a thread may be allocated within a single bank, such as a Bank 320. Such an allocation is referred to as a "thin" allocation type. FIG. 4A is an exemplary embodiment of a thin allocation of registers for processing threads in 4 banks accordance with one or more aspects of the present invention. In FIG. 4A registers to store operands for processing Thread A are allocated in Bank 0, registers to store operands for processing Thread B are allocated in Bank 1, registers to store operands for processing Thread C are allocated in Bank 2, and registers to store operands for processing Thread D are allocated in Bank 3. Registers to store operands for processing additional threads may be allocated in Bank 0, Bank 1, Bank 2, and/or Bank 3. In alternative embodiments of the present invention, fewer or more banks are used.

In another embodiment of the present invention, registers for storing operands for processing a thread may be allocated within each of the 4 banks, where each bank may be a Bank 320. Such an allocation is referred to as a "fat" allocation type. FIG. 4B is an exemplary embodiment of a fat allocation of registers for processing threads in 4 banks accordance with one or more aspects of the present invention. In FIG. 4B registers to store operands for processing Thread A are allocated in Bank 0, Bank 1, Bank 2, and Bank 3. Registers to store operands for processing Threads B, C, and D are also allocated in Bank 0, Bank 1, Bank 2, and Bank 3. In alternative embodiments of the present invention, fewer or more banks are used.

In some embodiments of the present invention, registers for processing threads are allocated in "bank count" units representing a specific number of registers in either a fat or thin allocation type. A register base address indicating the next available register for allocation may be tracked in Bank 0 and the next available registers in the other banks may be determined using the bank count, the allocation type, and the register base address.

Registers to store operands for processing additional threads may be allocated in Bank 0, Bank 1, Bank 2, and/or Bank 3 using either a fat or a thin allocation. However, mixing fat and thin allocation types may result in poor utilization of the registers available for allocation as shown in FIG. 4C. For example, when a first thread, such as Thread A uses a thin allocation in Bank 0 and a second thread, such as Thread B uses a fat allocation in each of the 4 banks, a third thread using a thin allocation may be delayed until execution of the first thread is completed. Alternatively, in some embodiments of the present invention, fat allocation types may be made from the top of each bank and thin allocation types may be made from the bottom of each bank, as shown in FIG. 4D. Threads A and B use a fat allocation and Threads C and D use a thin allocation. This "splitting" of the allocations permits packing of same allocation types to more efficiently utilize the registers available for allocation.

When a fat allocation is used for threads, the location assigned to each operand may simply proceed in a sequential order. FIG. 4E is an exemplary embodiment of an assignment of registers for threads in a sequential order in accordance with one or more aspects of the present invention. For example, a register allocated to thread A assigned to store Operand 400A is located in Bank 0, as is a register allocated to thread B assigned to store Operand 400B. If thread A and thread B are executing the same program instructions it is possible that a bank conflict will occur when thread A and thread B process a program instruction that reads Operand 400A for thread A and Operand 400B for thread B. The bank conflict may be avoided if Operand 400B and Operand 400A are not stored in the same bank.

A phase value may be used during the register assignment process so that threads processing the same program instruction will not have their corresponding operands specified by the program instruction assigned to registers that are in the same bank. FIG. 4F is an exemplary embodiment of an assignment of registers for threads using a phase value in accordance with one or more aspects of the present invention. For example, a register allocated to thread A assigned to store Operand 410A is located in Bank 0, and a register allocated to thread B assigned to store Operand 410B is located in Bank 1. If thread A and thread B are executing the same program instructions a bank conflict does not occur when thread A and thread B process a program instruction that reads Operand 410A for thread A and Operand 410B for thread B. In an alternate embodiment of the present invention, registers are remapped so that threads processing the same program instruction will not have their corresponding operands specified by the program instruction assigned to registers that are in the same bank. For example, with 4 Banks, the lower two bits of an assigned register number may be exclusive ORed (XOR) with a unique phase value corresponding to the thread that the register is allocated to. An alternative method of the present invention is to add the phase value modulo the number of Banks to the assigned register number.

When a fat allocation is used for registers, it is possible that two or more operands needed to process a program instruction will be assigned to registers in two or more different banks. For example if a program instruction for thread A specifies Operands 414A and 415A, read requests will be queued in two different Request Queues 310, one coupled to Bank 0 and the other coupled to Bank 1. Likewise, Operand 414A will be output to the Collector Unit 330 coupled to Bank 0 and Operand 415A will be output to the Collector Unit 330 coupled to Bank 1. Since a single Collector Unit 330 gathers the operands for each program instruction, a mechanism is used to permit the transfer of operands between the different banks and Collector Units 330.

FIG. 5 is a block diagram of another exemplary embodiment of the Register File Unit of FIG. 2 including a Crossbar 525 and a plurality of Banks 320, each Bank 320 coupled to a Bank Request Arbitration Unit 310, in accordance with one or more aspects of the present invention. Crossbar 525 is configured such that an operand output from any Bank 320 may be routed to the input of any Collector Unit 330. Therefore, all of the operands specified by a program instruction may be collected by a single Collector Unit 330. As described in conjunction with FIG. 3, each Collector Unit 330 gathers operands specified by a program instruction from any Bank 320. When Crossbar 525 is used thread scheduling and register allocation (fat or thin) may proceed more efficiently than when the number of Banks 320 is equal to the total number of Collector Units 330.

A Dispatcher Unit 540 is coupled between a set of Collector Units 330 and an Execution Unit B 575. Dispatcher Unit 540 may receive program instructions and corresponding operands, e.g., inputs, from each Collector Unit 330 within the set, therefore Dispatcher Unit 540 arbitrates between the Collector Units 330 within the set. In some embodiments of the present invention, Dispatcher Unit 540 arbitrates in a round-robin fashion. In other embodiments of the present invention, each Collector Unit 330 within the set has a corresponding priority and Dispatcher Unit 540 accepts inputs from each Collector Unit 330 based on the priority. For example, one Collector Unit 300 may have higher priority than the other Collector Units 330 and Dispatcher Unit 540 will always accept inputs from the one Collector Unit 330 if a program instruction and operands are available.

A single Collector Unit 330 is directly coupled to an Execution Unit A 565. Execution Unit A 565 may be configured to execution specific instructions that Exeuction Unit B 575 is not configured to execute. Therefore, single Collector Unit 330 accepts program instructions (and requests) for execution by Execution Unit A 565 and set of Collector Units 330 accepts program instructions (and requests) for execution by Execution Unit B 575.

FIG. 6A illustrates an embodiment of a method of allocating registers for processing a thread in accordance with one or more aspects of the present invention. In step 600 a register allocation request for a thread is received by Register Address Unit 240 from Thread Control Unit 220. In step 605 Register Address Unit 240 determines if the size, i.e., number of registers, needed to process the thread is less than or equal to a fixed or programmable value, X. If, Register Address Unit 240 determines the size is greater than X, then in step 610 Register Address Unit 240 allocates registers for storing operands in multiple Banks 320, i.e. a fat allocation. In step 615, Register Address Unit 240 updates a base pointer. The base pointer indicates the first location available for allocation within Banks 320.

In step 620 Register Address Unit 240 updates a phase value, so that registers assigned to operands allocated for a subsequent thread will be skewed relative to the registers allocated in step 610. In step 625 Register Address Unit 240 determines if the phase value is equal to N, where N is the number of Banks 320. If, in step 625, Register Address Unit 240 determines that the phase value is equal to N, in step 630, Register Address Unit 240 sets the phase value to 0 and proceeds to step 670. If, in step 625, Register Address Unit 240 determines that the phase value is not equal to N, Register Address Unit 240 proceeds to step 670 and outputs the allocation information to Request Distribution Unit 300 within Register File Unit 250.

If, in step 605 Register Address Unit 240 determines the size is less than or equal to X, then in step 635 Register Address Unit 240 determines if the Bank 320 available for a thin allocation is N−1. If, in step 635, Register Address Unit 240 determines the Bank 320 available for allocation is bank N−1, as specified by a bank indicator, then in step 650 Register Address Unit 240 updates the base to indicate the first location available for allocation and proceeds to step 645. If, in step 635, Register Address Unit 240 determines the Bank 320 available for allocation is not bank N−1, then in step 640 Register Address Unit 240 updates the bank indicator by incrementing the bank indicator by 1. In step 645 Register Address Unit 240 allocates registers for storing operands in a single Bank 320, i.e. a thin allocation, specified by the bank indicator and proceeds to step 670. As previously described, in step 670 Register Address Unit 240 outputs the allocation information to Request Distribution Unit 300 within Register File Unit 250.

FIG. 6B illustrates an embodiment of another method of allocating registers for processing a thread in accordance with one or more aspects of the present invention. In step 600 Register Address Unit 240 receives a register allocation request, including an allocation type of fat or thin. In some embodiments of the present invention, the allocation type is determined when the program instructions are compiled and is provided to Register Address Unit 240 by a driver. In step 603 Register Address Unit 240 determines if the specified allocation type is thin, and, if so, proceeds to steps 610, 615, 620, 625, 630, and 670, as previously described in conjunction with FIG. 6A. If, in step 603 Register Address Unit 240 determines that the specified allocation type is not thin, then Register Address Unit 240 proceeds to steps 635, 640, 645, 650, and 670, as previously described in conjunction with FIG. 6A.

FIG. 6C illustrates an embodiment of another method of allocating registers for processing a thread in accordance with one or more aspects of the present invention. In step 600 Register Address Unit 240 receives a register allocation request, including an allocation type of fat or thin. In step 603 Register Address Unit 240 determines if the specified allocation type is thin, and, if so, in step 607 Register Address Unit 240 determines if the thin allocation will fit, i.e., if the number of registers needed are available, within the Bank 320 specified by the bank indicator. If, in step 607 Register Address Unit 240 determines that the thin allocation will fit within the Bank 320, then Register Address Unit 240 proceeds to steps 635, 640, 645, 650, and 670, as previously described in conjunction with FIG. 6A.

If, in step 603 Register Address Unit 240 determines the specified allocation type is not thin, then Register Address Unit 240 proceeds to steps 610, 615, 620, 625, 630, and 670, as previously described in conjunction with FIG. 6A. If, in step 607 Register Address Unit 240 determines that the thin allocation will not fit within the Bank 230, then Register Address Unit 240 also proceeds to steps 610, 615, 620, 625, 630, and 670, as previously described in conjunction with FIG. 6A.

Therefore, persons skilled in the art will appreciate that any system configured to perform the method steps of FIGS. 6A, 6B, 6C, or their equivalents, is within the scope of the present invention. Furthermore, persons skilled in the art will appreciate that the method steps of FIGS. 6A, 6B, 6C, may be extended to support a register file unit including any number of banks to simulate a multiported memory.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of simulating a single multiport memory using a plurality of single port memories providing registers for storing operands for execution by one of a plurality of threads, and allocating the registers into memory banks, each of the banks being associated with at least one of the threads, comprising:
    determining a number of registers allocated for a first one of the threads;
    allocating the number of registers for the thread to locations in at least one memory bank of a set of memory banks configured to simulate the single multiported memory;
    assigning the registers so that the first and second threads are enabled to process the same program instruction without the corresponding operands specified by the same program instruction being stored in the same bank;
    repeating the determining and allocating steps for a second one of the threads;
    reading a first operand specified by a program instruction within the second thread from a register within the set of memory banks into a first associated collector;
    reading a second operand specified by the program instruction within the first thread from a register within the set of memory banks into a second associated collector; and
    dispatching the program instruction, the first operand, and the second operand from each of the first and second associated collectors to the first and second threads for execution so that the speed of execution of each of the threads is not reduced by use of the lower port count memories.

2. The method of claim 1, wherein the number of registers allocated for the thread is divided into portions and the portions are allocated in more than one memory bank within the set of memory banks.

3. The method of claim 1, wherein the number of registers allocated for the thread is located in a single memory bank within the set of memory banks.

4. The method of claim 1, wherein the allocation of the number of registers is based on an allocation type.

5. The method of claim 4, further comprising the step of determining the allocation type is based on the number of registers allocated for the thread.

6. The method of claim 4, further comprising the step of receiving the allocation type from a driver.

7. The method of claim 1 wherein the number of registers allocated for each of the threads is divided into portions and portions are allocated either all in one bank of the set of memory banks or equally among all the banks of the set of memory banks, and wherein the one bank of the memory banks stores a register base address indicating the next available register for allocation, the allocation type, and a register base address in the next register to be allocated.

8. The method of claim 1 wherein the number of registers allocated for one or more of the threads is divided into portions, and the registers are allocated based on either a fat or thin allocation, with the fat allocation in a memory bank being from one end of the memory bank, and a thin allocation in the one memory bank being from the opposite end of the memory bank.

9. A method as claims in claim 1 wherein any of the operands in any of the memory banks can be directed through a cross bar unit to any of the collector units so that each of the collector units gather operands for a program instruction to be executed in any of the threads from multiple ones of the memory banks.

10. A register file unit for storing operands for graphics register file unit outputs operands program instructions in a plurality of single port memories having a number of single ports less than needed to output the operands needed to execute at least one of the instructions in a single clock cycle, comprising:
    a first memory bank comprising a plurality of a single port memories configured to simulate a single multiport memory to store operands for a first thread;
    a second memory bank comprising a plurality of single port memories configured to store operands for a second thread;
    a first collector unit configured to receive the operands for the first thread from the first memory bank and output a program instruction of the first thread and any operand specified by the program instruction of the first thread;
    a second collector unit configured to receive the operands for the second thread from the second memory bank and output a program instruction of the second thread and any operand specified by the program instruction of the second thread to first and second threads for execution so that the speed of execution of each of the threads is not reduced by use of the lower port count memories; and
    the operands being stored and distributed being between the first and second memory banks so that the same instruction may be executed simultaneously in both the first and second threads without accessing operands stored in a single one of the first and second memory banks.

11. The method of claim 10, further comprising assigning registers within the allocated set of registers for the thread to the at least one memory bank using a phase value associated with the thread to assign each register so that the first and second threads are not reading operands from the same one of the memory banks when the threads are processing the same instructions.

12. The register file of claim 10, further comprising a crossbar unit coupling the first and second memory banks to the first and second collector units in order for either of the first and second collectors to receive operands for threads from either of the first and second memory banks.

13. The register file of claim 12 including additional memory banks and collector units such that the memory banks and collector units are not equal in number, the crossbar unit being configured so that an operand output from any bank may be routed to an input of any of the collector units.

14. The register file of claim 10, further comprising:
a first bank request arbitration unit configured to output operand read requests to the first memory bank; and
a second bank request arbitration unit configured to output operand read requests to the second memory bank.

15. The register file of claim 10, further comprising a dispatcher unit coupled to the second collector unit and configured to arbitrate between the collector units and the threads to output either the program instruction of the first thread and any operand specified by the program instruction of the first thread or the program instruction of the second thread and any operand specified by the program instruction of the second thread.

16. The register file of claim 15, further comprising an execution unit configured to execute any program instruction output by the dispatcher unit, the dispatcher unit configured to output operands to the execution unit based on a priority established among the collector units by the dispatcher unit.

17. The register file of claim 15, further comprising an execution unit configured to execute any program instruction output by the first collector unit.

18. The system of claim 10 further including a selector unit connected between each of the memory banks and each of the collector units to receive source data not stored within banks and provided the source data to the collector unit.

19. The system of claim 10 further comprising an execution unit for receiving the instruction and the operands from the first and second collector units and for outputting a write request to one of the first and second banks if a destination operand was specified by the instruction.

20. A register file as claimed in claim 10 including a register address unit for determining a number of registers needed to process a thread and for determining whether a fat or thin allocation is to be used, the register address unit being further configured to update a base pointer indicating the first location available for allocation within the first and second register banks.

21. A register address unit as claimed in claim 20 wherein the register address unit is further configured to update a phase value after determining a number of registers needed so that the registers assigned to operands allocated for a next subsequent thread will be skewed relative to the registers already allocated.

* * * * *